United States Patent
Ruzicka et al.

(10) Patent No.: US 12,510,061 B2
(45) Date of Patent: Dec. 30, 2025

(54) SHAPE MEMORY ALLOY (SMA) BIMORPH ACTUATORS AND METHODS FOR MANUFACTURING THE SAME

(71) Applicant: Hutchinson Technology Incorporated, Hutchinson, MN (US)

(72) Inventors: Ryan N. Ruzicka, Waconia, MN (US); Zachary A. Pokornowski, Cokato, MN (US); Mark A. Miller, Hutchinson, MN (US); Jeremy J. Stroschein, Waconia, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 273 days.

(21) Appl. No.: 18/133,740

(22) Filed: Apr. 12, 2023

(65) Prior Publication Data

US 2024/0344505 A1 Oct. 17, 2024

(51) Int. Cl.
*F03G 7/06* (2006.01)
*B29C 45/14* (2006.01)
*H01R 4/01* (2006.01)

(52) U.S. Cl.
CPC .... *F03G 7/06143* (2021.08); *B29C 45/14639* (2013.01); *B29C 45/14778* (2013.01); *H01R 4/01* (2013.01)

(58) Field of Classification Search
CPC ........... F03G 7/06143; B29C 45/14639; B29C 45/14778; H01R 4/01; H01R 12/63; H01H 37/323; H01H 61/0107; H01H 71/145; H01H 2085/0004
See application file for complete search history.

(56) References Cited

U.S. PATENT DOCUMENTS

| 5,588,295 A | 12/1996 | Brotz |
| 6,367,252 B1 | 4/2002 | Hill et al. |
| 6,384,514 B1 | 5/2002 | Slutskiy et al. |

(Continued)

FOREIGN PATENT DOCUMENTS

| CA | 2018302 A1 | 11/1991 |
| CN | 1333178 A | 1/2002 |

(Continued)

OTHER PUBLICATIONS

Notice of Allowance in Japanese Patent Application No. 2021-557623 dated Nov. 5, 2024.

(Continued)

*Primary Examiner* — Jacob R Crum
(74) *Attorney, Agent, or Firm* — DLA Piper LLP (US)

(57) ABSTRACT

The present embodiments relate to a shape memory alloy (SMA) actuator with a reduced number of materials for manufacturing the actuator. In some instances, elements of the SMA actuator can comprise a dielectric material disposed on the actuator via an injection molding process. In other instances, the SMA actuator can dispose SMA wires above a base of the SMA actuator without the use of any dielectric material. In a first example, an SMA actuator can include a carriage and a base. The base can include a fixed end fixed to the carriage, a free end, a beam connecting the fixed end and the free end, and at least one SMA wire. The SMA actuator can also include an insulator comprising a dielectric material electrically isolating a set of electrical contacts at the fixed end.

8 Claims, 12 Drawing Sheets

(56) References Cited

U.S. PATENT DOCUMENTS

| | | |
|---|---|---|
| 6,698,201 B1 | 3/2004 | Sarkar et al. |
| 7,256,518 B2 | 8/2007 | Gummin et al. |
| 7,349,236 B2 | 3/2008 | Lin et al. |
| 7,444,812 B2 | 11/2008 | Kirkpatirck et al. |
| 8,448,436 B2 | 5/2013 | Browne et al. |
| 8,607,619 B2 | 12/2013 | Djakov et al. |
| 8,707,694 B2 | 4/2014 | Olson et al. |
| 9,362,853 B2 | 6/2016 | Dehe |
| 9,581,147 B2 | 2/2017 | Flaschentrager et al. |
| 10,270,959 B1 | 4/2019 | Bart et al. |
| 10,427,934 B1 | 10/2019 | Coutu, Jr. et al. |
| 10,920,755 B2 | 2/2021 | Miller et al. |
| 11,105,319 B2 | 8/2021 | Miller et al. |
| 11,199,183 B2 | 12/2021 | Miller et al. |
| 11,306,706 B2 | 4/2022 | Ruzicka et al. |
| 11,333,134 B2 | 5/2022 | Miller et al. |
| 11,448,853 B2 | 9/2022 | Miller et al. |
| 11,668,288 B2 | 6/2023 | Ruzicka et al. |
| 11,686,294 B2 | 6/2023 | Miller et al. |
| 11,815,794 B2 | 11/2023 | Ruzicka et al. |
| 11,859,598 B2 | 1/2024 | Jelkin et al. |
| 11,867,160 B2 | 1/2024 | Miller et al. |
| 11,892,759 B2 | 2/2024 | Ruzicka et al. |
| 11,982,263 B1 | 5/2024 | Ruzicka |
| 12,049,877 B2 | 7/2024 | Miller et al. |
| 12,055,844 B2 | 8/2024 | Ruzicka et al. |
| 2001/0002226 A1 | 5/2001 | Tanaka et al. |
| 2001/0010488 A1* | 8/2001 | Minners ............. H01H 61/0107 337/126 |
| 2002/0057148 A1 | 5/2002 | Johnson et al. |
| 2004/0256920 A1 | 12/2004 | Gummin et al. |
| 2004/0261411 A1 | 12/2004 | MacGregor |
| 2005/0063038 A1 | 3/2005 | Filhol |
| 2006/0038643 A1* | 2/2006 | Xu ........................ F03G 7/0614 335/78 |
| 2006/0092514 A1 | 5/2006 | Koo et al. |
| 2007/0030573 A1 | 2/2007 | Batchko et al. |
| 2007/0090314 A1 | 4/2007 | Van Der Wijngaart et al. |
| 2007/0119165 A1 | 5/2007 | Yson et al. |
| 2007/0279497 A1 | 12/2007 | Wada et al. |
| 2007/0280668 A1 | 12/2007 | Kubo et al. |
| 2008/0198249 A1 | 8/2008 | Tanimura et al. |
| 2008/0247748 A1 | 10/2008 | Tanimura et al. |
| 2008/0259467 A1 | 10/2008 | Chung |
| 2008/0259470 A1 | 10/2008 | Chung |
| 2008/0287167 A1 | 11/2008 | Caine |
| 2009/0025501 A1 | 1/2009 | Mitteer |
| 2009/0097140 A1 | 4/2009 | Choi et al. |
| 2009/0159311 A1 | 6/2009 | Zheng et al. |
| 2009/0167108 A1 | 7/2009 | Yang |
| 2010/0027119 A1 | 2/2010 | Kollar et al. |
| 2010/0060776 A1 | 3/2010 | Topliss et al. |
| 2010/0074607 A1 | 3/2010 | Topliss et al. |
| 2010/0276492 A1 | 11/2010 | Wang et al. |
| 2011/0009979 A1 | 1/2011 | Shaw et al. |
| 2011/0026148 A1 | 2/2011 | Tanimura et al. |
| 2011/0063741 A1 | 3/2011 | Park et al. |
| 2011/0102920 A1 | 5/2011 | Shyu et al. |
| 2011/0103784 A1 | 5/2011 | Hashizume et al. |
| 2011/0107758 A1 | 5/2011 | Kotanagi et al. |
| 2011/0122201 A1 | 5/2011 | Silverbrook |
| 2011/0169920 A1 | 7/2011 | Ryu et al. |
| 2011/0179786 A1 | 7/2011 | Topliss et al. |
| 2011/0217031 A1 | 9/2011 | Eromaki |
| 2011/0249131 A1 | 10/2011 | Topliss et al. |
| 2011/0249336 A1 | 10/2011 | Sato |
| 2012/0019675 A1 | 1/2012 | Brown |
| 2012/0026387 A1 | 2/2012 | Kosaka et al. |
| 2012/0108980 A1 | 5/2012 | Shilling et al. |
| 2012/0174571 A1 | 7/2012 | Villanueva et al. |
| 2012/0249868 A1 | 10/2012 | Kamatani et al. |
| 2013/0002933 A1 | 1/2013 | Topliss et al. |
| 2013/0016419 A1 | 1/2013 | Morita et al. |
| 2014/0007571 A1 | 1/2014 | Jee |
| 2014/0028906 A1 | 1/2014 | Chen |
| 2014/0298794 A1 | 10/2014 | Flaschentrager et al. |
| 2014/0340575 A1 | 11/2014 | Kim |
| 2014/0355120 A1 | 12/2014 | Yeo |
| 2015/0090356 A1 | 4/2015 | Clingman et al. |
| 2015/0146312 A1 | 5/2015 | Gutierrez et al. |
| 2015/0289994 A1 | 10/2015 | Engeberg et al. |
| 2015/0304561 A1 | 10/2015 | Howarth et al. |
| 2015/0346507 A1 | 12/2015 | Howarth |
| 2016/0017870 A1 | 1/2016 | Mather |
| 2016/0187613 A1 | 6/2016 | Seo et al. |
| 2016/0201654 A1 | 7/2016 | Apdalhaliem et al. |
| 2016/0227088 A1 | 8/2016 | Brown et al. |
| 2017/0146769 A1 | 5/2017 | Huang et al. |
| 2017/0219443 A1 | 8/2017 | Davis et al. |
| 2017/0276122 A1 | 9/2017 | Van Den Aker |
| 2018/0025974 A1 | 1/2018 | Basker et al. |
| 2018/0033948 A1 | 2/2018 | Ee |
| 2018/0052381 A1 | 2/2018 | Koepfer |
| 2018/0120583 A1 | 5/2018 | Avivi et al. |
| 2018/0171991 A1 | 6/2018 | Miller et al. |
| 2019/0228939 A1* | 7/2019 | Chiu .................... H01H 61/063 |
| 2019/0264664 A1 | 8/2019 | Zamani et al. |
| 2019/0285060 A1 | 9/2019 | Mirvakili et al. |
| 2020/0150443 A1 | 5/2020 | Ebert |
| 2020/0191128 A1* | 6/2020 | Promutico ........... H01H 37/323 |
| 2021/0131405 A1 | 5/2021 | Miller et al. |
| 2021/0381497 A1 | 12/2021 | Miller et al. |
| 2022/0106942 A1 | 4/2022 | Miller et al. |
| 2022/0128046 A1 | 4/2022 | Ruzicka et al. |
| 2022/0397103 A1* | 12/2022 | Jelkin ..................... G02B 7/09 |
| 2023/0131889 A1 | 4/2023 | Sturm et al. |
| 2023/0176457 A1 | 6/2023 | Ruzicka et al. |
| 2023/0176458 A1 | 6/2023 | Ruzicka et al. |
| 2023/0248579 A1 | 8/2023 | Evans et al. |
| 2024/0036446 A1 | 2/2024 | Ruzicka et al. |
| 2024/0077782 A1 | 3/2024 | Miller et al. |
| 2024/0125306 A1 | 4/2024 | Miller |
| 2024/0184188 A1 | 6/2024 | Ruzicka et al. |
| 2024/0369047 A1 | 11/2024 | Ruzicka |

FOREIGN PATENT DOCUMENTS

| | | |
|---|---|---|
| CN | 101896719 A | 11/2010 |
| CN | 101923633 A | 12/2010 |
| CN | 102055890 A | 5/2011 |
| CN | 102099939 A | 6/2011 |
| CN | 103168264 A | 6/2013 |
| CN | 103670980 A | 3/2014 |
| CN | 104364699 A | 2/2015 |
| CN | 105164413 A | 12/2015 |
| CN | 105487194 A | 4/2016 |
| CN | 107735712 A | 2/2018 |
| CN | 110709757 A | 1/2020 |
| CN | 112654786 A | 4/2021 |
| CN | 111396274 B | 5/2022 |
| EP | 1 243 793 A2 | 9/2002 |
| EP | 1 630 416 A1 | 3/2006 |
| EP | 2 262 095 A1 | 12/2010 |
| EP | 2 551 523 A1 | 1/2013 |
| GB | 2577203 A | 3/2020 |
| JP | 4-337222 A | 11/1992 |
| JP | 2000-137155 A | 5/2000 |
| JP | 2002-98911 A | 4/2002 |
| JP | 2009-251244 A | 10/2009 |
| JP | 2016-501338 A | 1/2016 |
| JP | 2019-28439 A | 2/2019 |
| KR | 10-2020-0003864 A | 1/2020 |
| TW | 201106039 A | 2/2011 |
| WO | WO 00/58980 A1 | 10/2000 |
| WO | WO 2009/072748 A1 | 6/2009 |
| WO | WO 2012/020212 A1 | 2/2012 |
| WO | 2016/189314 A1 | 12/2016 |
| WO | WO 2018/204888 A1 | 11/2018 |
| WO | WO 2020/205453 A1 | 10/2020 |

OTHER PUBLICATIONS

Combined Search and Examination Report in United Kingdom

(56) References Cited

OTHER PUBLICATIONS

Application No. 2406075.8 dated Sep. 17, 2024.
Office Action in U.S. Appl. No. 17/146,213 dated Oct. 29, 2024.
Notice of Allowance in U.S. Appl. No. 18/379,105 dated Nov. 6, 2024.
Office Action in U.S. Appl. No. 18/631,960 dated Oct. 28, 2024.
Decision of Rejection in Taiwan Patent Application No. 109110412 dated Mar. 13, 2024.
International Search Report and Written Opinion in International Application No. PCT/US2023/035154 dated Mar. 22, 2024.
Office Action in U.S. Appl. No. 17/146,213 dated Mar. 19, 2024.
Notice of Allowance in U.S. Appl. No. 17/412,030 dated Apr. 9, 2024.
Notice of Allowance in U.S. Appl. No. 18/103,725 dated Apr. 24, 2024.
Office Action in U.S. Appl. No. 18/379,105 dated Apr. 22, 2024.
Office Action in Taiwan Patent Application No. 109110412 dated Sep. 11, 2023.
International Preliminary Report on Patentability in International Application No. PCT/US2022/017100 dated Aug. 31, 2023.
Office Action in U.S. Appl. No. 17/412,030 dated Sep. 21, 2023.
Notice of Allowance in U.S. Appl. No. 17/549,348 dated Aug. 23, 2023.
Notice of Allowance in U.S. Appl. No. 17/569,268 dated Aug. 1, 2023.
Office Action in U.S. Appl. No. 18/103,725 dated Oct. 4, 2023.
Notice of Allowance in U.S. Appl. No. 18/103,745 dated Sep. 22, 2023.
Notice of Allowance in U.S. Appl. No. 17/831,318 dated Aug. 14, 2023.
Office Action in U.S. Appl. No. 18/142,471 dated Sep. 19, 2023.
Notice of Reasons for Rejection in Japanese Patent Application No. 2021-557623 dated Jul. 2, 2024.
International Search Report and Written Opinion in International Application No. PCT/US2024/022084 dated Aug. 7, 2024.
Office Action in U.S. Appl. No. 17/146,213 dated Jul. 25, 2024.
Office Action in U.S. Appl. No. 18/379,105 dated Aug. 14, 2024.
Office Action in U.S. Appl. No. 18/407,667 dated Aug. 9, 2024.
Notice of Reasons for Rejection in Japanese Patent Application No. 2021-557623 dated Dec. 5, 2023.
Examination Report in United Kingdom Application No. 2219080.5 dated Dec. 12, 2023.
Examination Report in United Kingdom Application No. 2218440.2 dated Nov. 29, 2023.
International Preliminary Report on Patentability in International Application No. PCT/US2022/032259 dated Dec. 21, 2023.
Office Action in U.S. Appl. No. 17/146,213 dated Nov. 22, 2023.
Office Action in U.S. Appl. No. 17/412,030 dated Dec. 22, 2023.
Office Action in U.S. Appl. No. 18/103,725 dated Jan. 19, 2024.
Notice of Allowance in U.S. Appl. No. 18/142,471 dated Jan. 18, 2024.
Beyer et al., "Resistance Welding of TiNi-Shape Memory Alloys", European Symposium on Martensitic Transformations (ESOMAT), pp. 199-206, 1989.
International Search Report and Written Opinion in International Application No. PCT/US2018/031256 dated Oct. 15, 2018.
International Preliminary Report on Patentability in International Application No. PCT/US2018/031256 dated Nov. 14, 2019.
Office Action in Chinese Patent Application No. 201880029763.5 dated Apr. 29, 2021.
Office Action in Chinese Patent Application No. 201880029763.5 dated Dec. 20, 2021.
Office Action in Chinese Patent Application No. 201880029763.5 dated May 20, 2022.
Notice of Granting Patent Right for Invention in Chinese Patent Application No. 201880029763.5 dated Aug. 23, 2022.
Examination Report in United Kingdom Application No. 1917208.9 dated Aug. 13, 2021.
Examination Report in United Kingdom Application No. 1917208.9 dated Oct. 22, 2021.
Examination Report in United Kingdom Application No. 1917208.9 dated Mar. 8, 2022.
Search Report in United Kingdom Application No. 1917208.9 dated Mar. 30, 2022.
Notice of Preliminary Rejection in Korean Application No. 10-2019-7035566 dated Jan. 4, 2023.
Notice of Allowance in Korean Application No. 10-2019-7035566 dated Jul. 1, 2023.
Combined Search and Examination Report in United Kingdom Application No. 2206304.4 dated May 17, 2022.
International Search Report and Written Opinion in International Application No. PCT/US2020/025065 dated Jun. 23, 2020.
International Preliminary Report on Patentability in International Application No. PCT/US2020/025065 dated Oct. 14, 2021.
Office Action in Chinese Patent Application No. 202080004847.0 dated Jul. 1, 2022.
Office Action in Chinese Patent Application No. 202080004847.0 dated Jan. 28, 2023.
Examination Report in United Kingdom Application No. 2113598.3 dated Jun. 23, 2022.
International Search Report and Written Opinion in International Application No. PCT/US2021/037947 dated Sep. 23, 2021.
International Preliminary Report on Patentability in International Application No. PCT/US2021/037947 dated Jan. 5, 2023.
International Search Report and Written Opinion in International Application No. PCT/US2021/036211 dated Sep. 8, 2021.
International Preliminary Report on Patentability in International Application No. PCT/US2021/036211 dated Dec. 22, 2022.
Combined Search and Examination Report in United Kingdom Application No. 2114527.1 dated Mar. 9, 2022.
Office Action in Chinese Utility Model Application No. 202121424905.3 dated Oct. 27, 2021.
International Search Report and Written Opinion in International Application No. PCT/US2022/017100 dated Jun. 2, 2022.
Office Action in Chinese Patent Application No. 202111072217.X dated Dec. 1, 2022.
Office Action in Chinese Utility Model Application No. 202222023197.3 dated Oct. 11, 2022.
International Search Report and Written Opinion in International Application No. PCT/US2022/032259 dated Sep. 22, 2022.
Office Action in Chinese Patent Application No. 202111072378.9 dated Dec. 1, 2022.
Office Action in Chinese Patent Application No. 202111072378.9 dated Apr. 28, 2023.
Office Action in U.S. Appl. No. 15/971,995 dated Aug. 22, 2019.
Office Action in U.S. Appl. No. 15/971,995 dated Nov. 20, 2019.
Office Action in U.S. Appl. No. 15/971,995 dated Apr. 28, 2020.
Notice of Allowance in U.S. Appl. No. 15/971,995 dated Sep. 30, 2020.
Office Action in U.S. Appl. No. 16/775,207 dated Jun. 5, 2020.
Office Action in U.S. Appl. No. 16/775,207 dated Jun. 9, 2020.
Office Action in U.S. Appl. No. 16/775,207 dated Sep. 30, 2020.
Office Action in U.S. Appl. No. 16/775,207 dated Jan. 11, 2021.
Notice of Allowance in U.S. Appl. No. 16/775,207 dated Apr. 28, 2021.
Office Action in U.S. Appl. No. 16/859,929 dated Jun. 9, 2020.
Office Action in U.S. Appl. No. 16/859,929 dated Sep. 24, 2020.
Office Action in U.S. Appl. No. 16/859,929 dated Apr. 16, 2021.
Notice of Allowance in U.S. Appl. No. 16/859,929 dated Aug. 3, 2021.
Office Action in U.S. Appl. No. 17/549,348 dated Oct. 28, 2022.
Office Action in U.S. Appl. No. 17/549,348 dated Apr. 14, 2023.
Office Action in U.S. Appl. No. 17/195,497 dated May 17, 2021.
Office Action in U.S. Appl. No. 17/195,497 dated Sep. 8, 2021.
Notice of Allowance in U.S. Appl. No. 17/195,497 dated Dec. 14, 2021.
Office Action in U.S. Appl. No. 17/339,797 dated Nov. 17, 2021.
Office Action in U.S. Appl. No. 17/339,797 dated Mar. 7, 2022.
Notice of Allowance in U.S. Appl. No. 17/339,797 dated May 16, 2022.
Notice of Allowance in U.S. Appl. No. 17/714,069 dated Jan. 24, 2023.
Office Action in U.S. Appl. No. 17/207,530 dated May 27, 2021.

(56) References Cited

OTHER PUBLICATIONS

Office Action in U.S. Appl. No. 17/207,530 dated Sep. 8, 2021.
Notice of Allowance in U.S. Appl. No. 17/207,530 dated Jan. 18, 2022.
Office Action in U.S. Appl. No. 17/729,877 dated Oct. 13, 2022.
Notice of Allowance in U.S. Appl. No. 17/729,877 dated Feb. 14, 2023.
Office Action in U.S. Appl. No. 17/569,268 dated Jan. 27, 2023.
Office Action in U.S. Appl. No. 17/569,268 dated May 25, 2023.
Office Action in U.S. Appl. No. 18/103,725 dated Jun. 14, 2023.
Office Action in U.S. Appl. No. 18/103,745 dated Jun. 14, 2023.
Office Action in U.S. Appl. No. 17/831,318 dated Apr. 20, 2023.

* cited by examiner

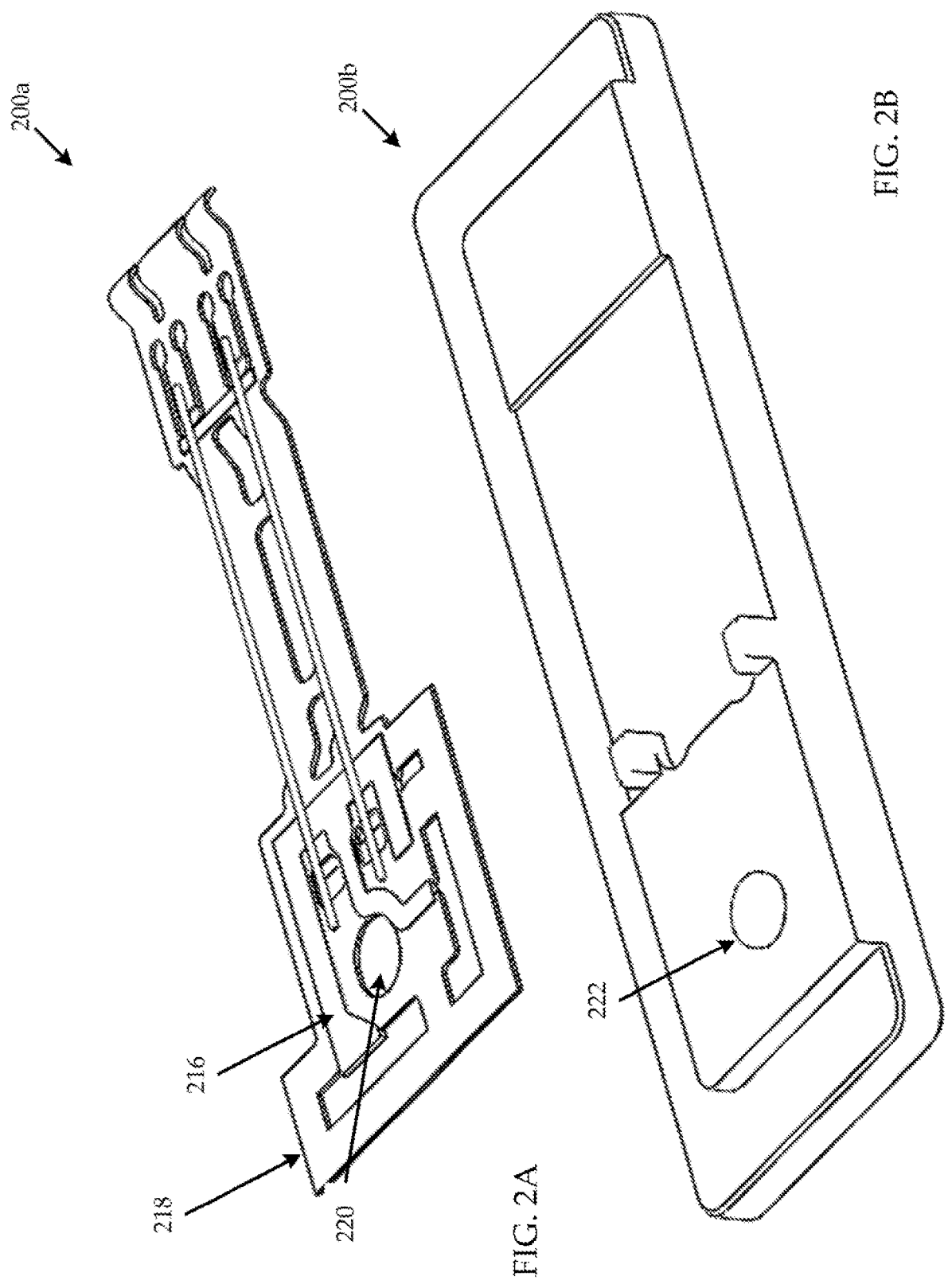

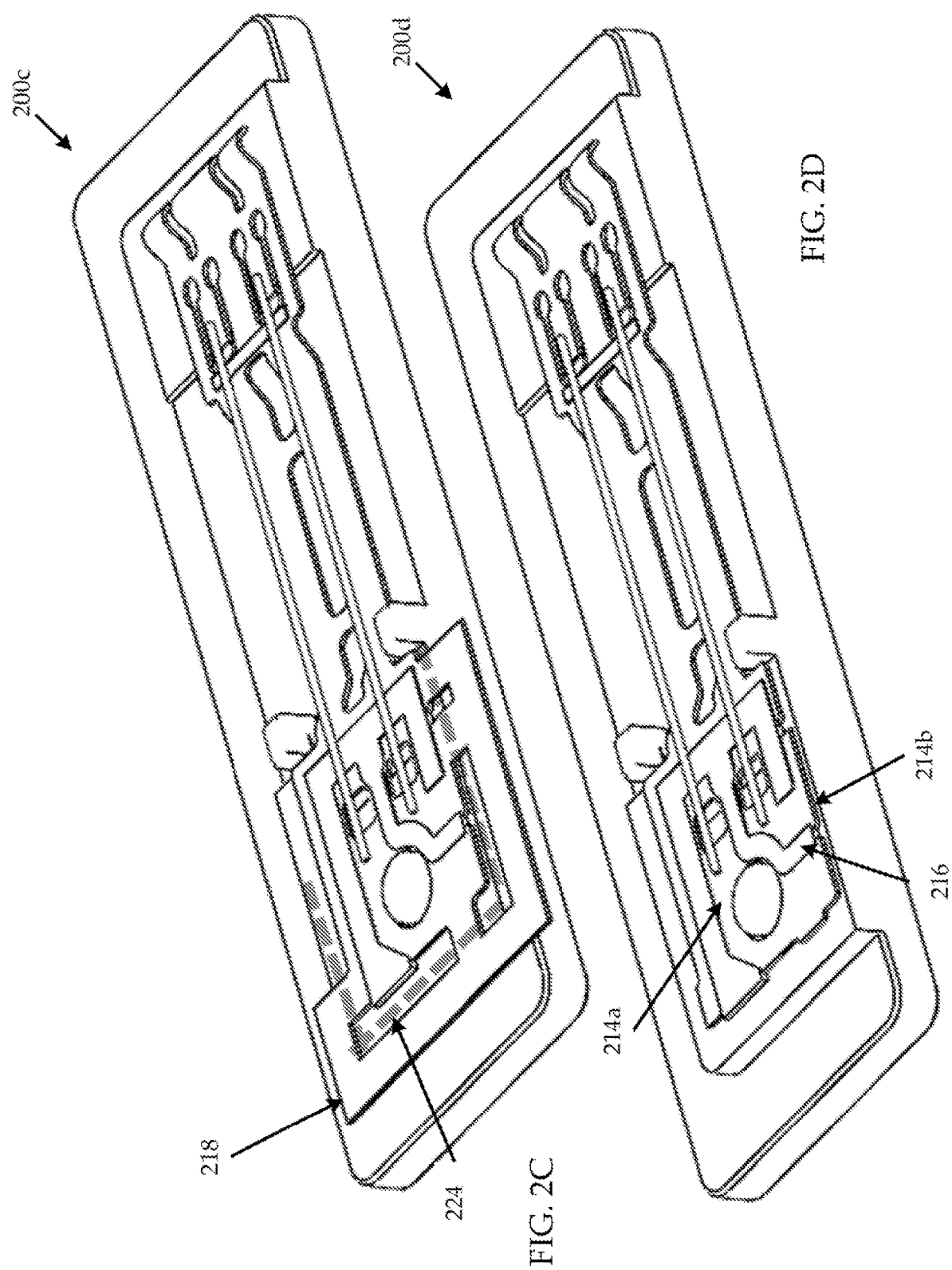

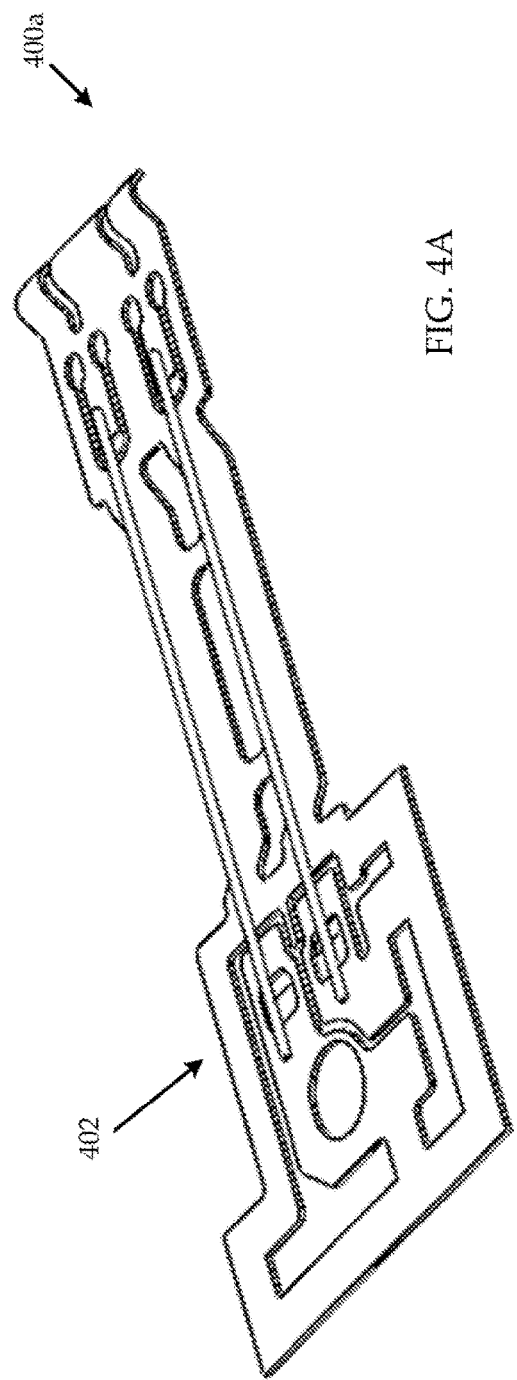
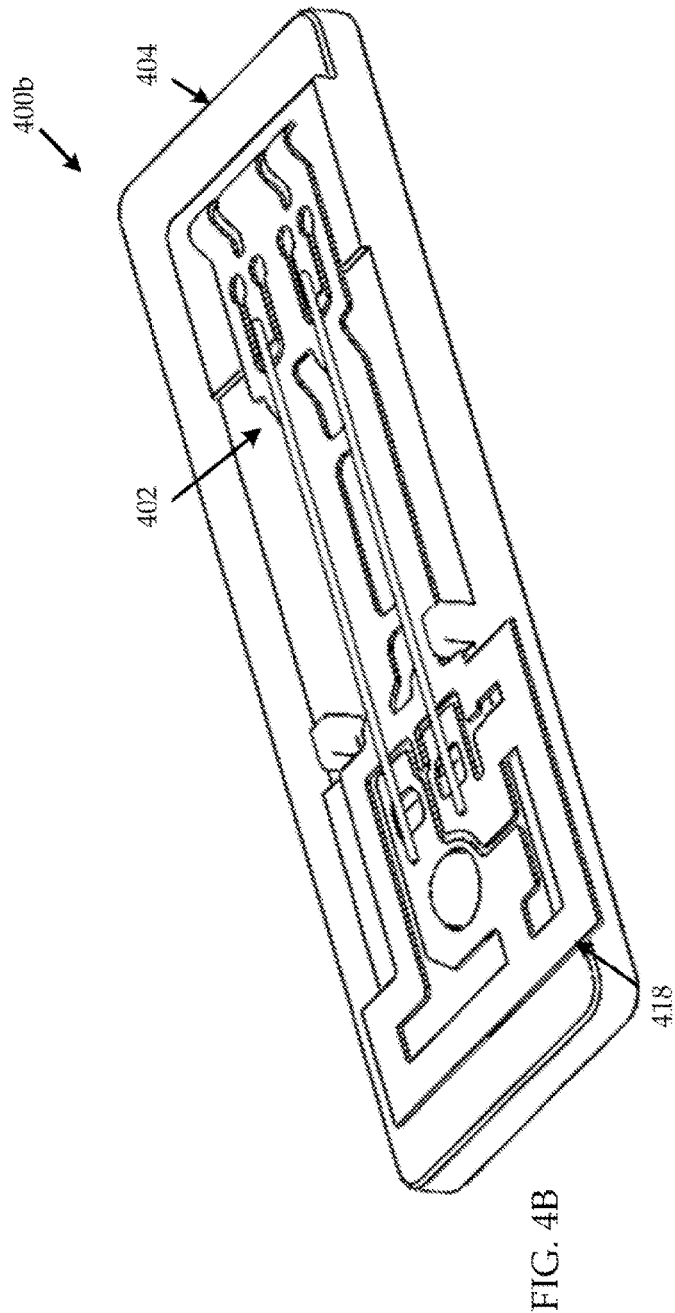
FIG. 4A
FIG. 4B

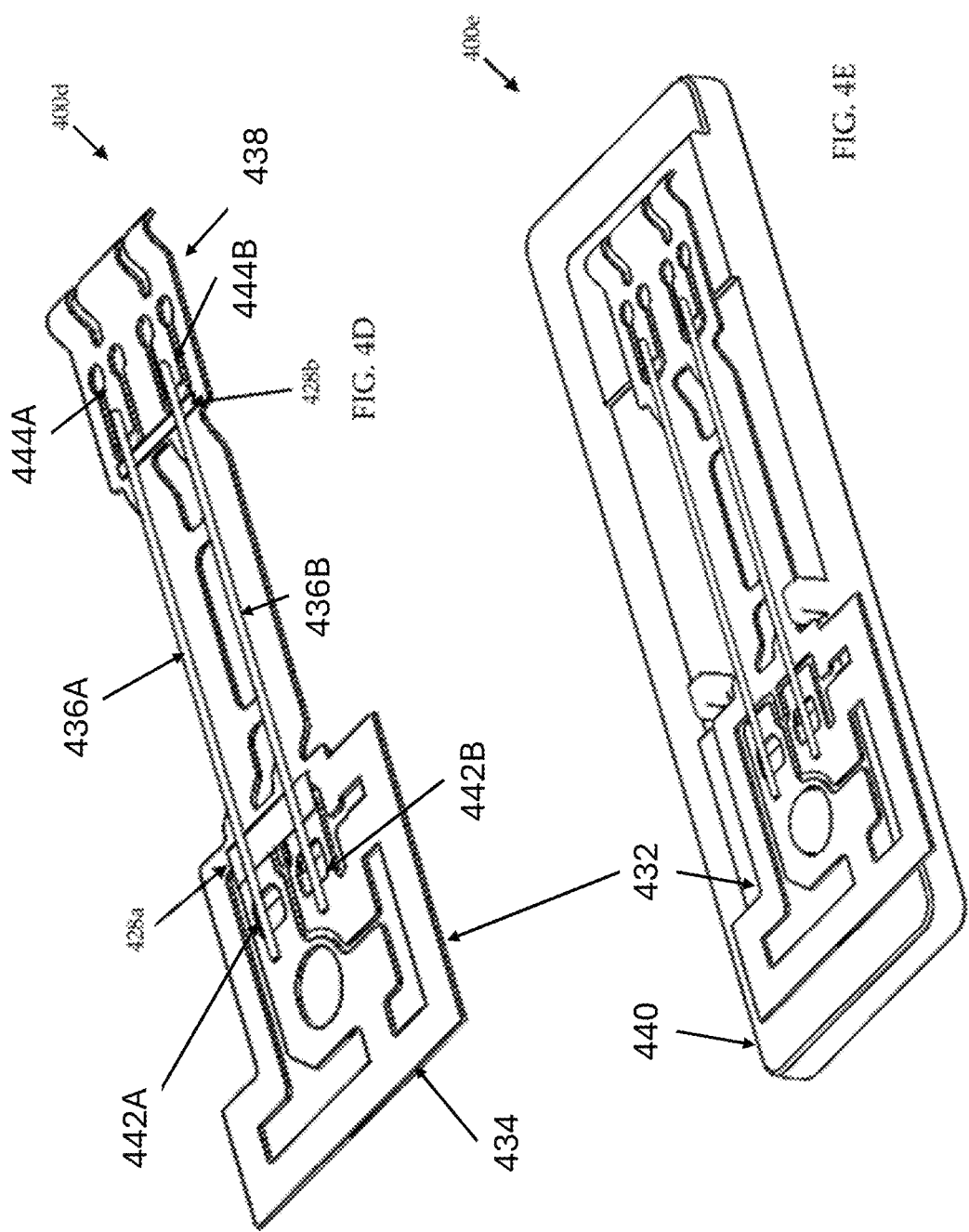

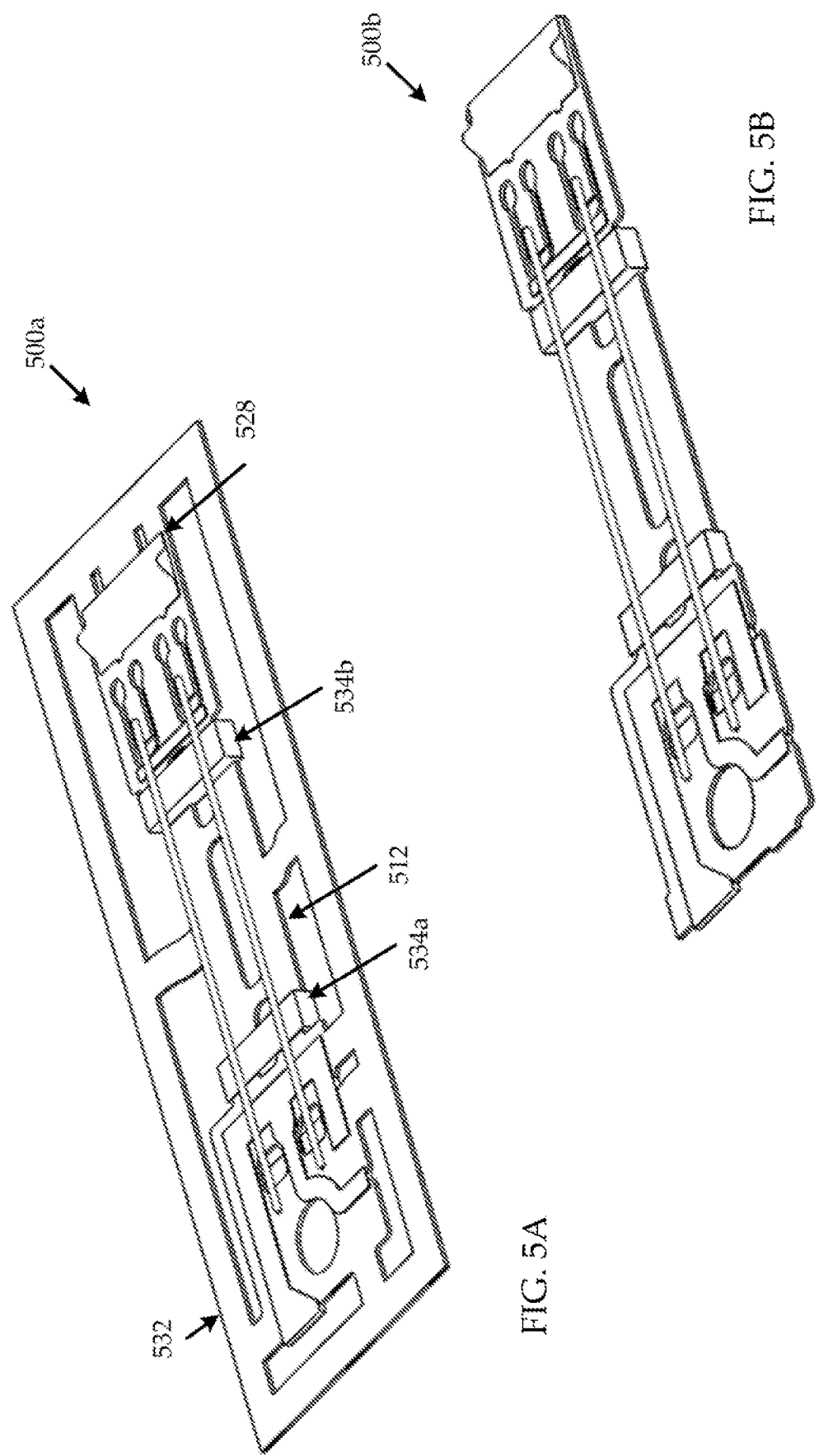

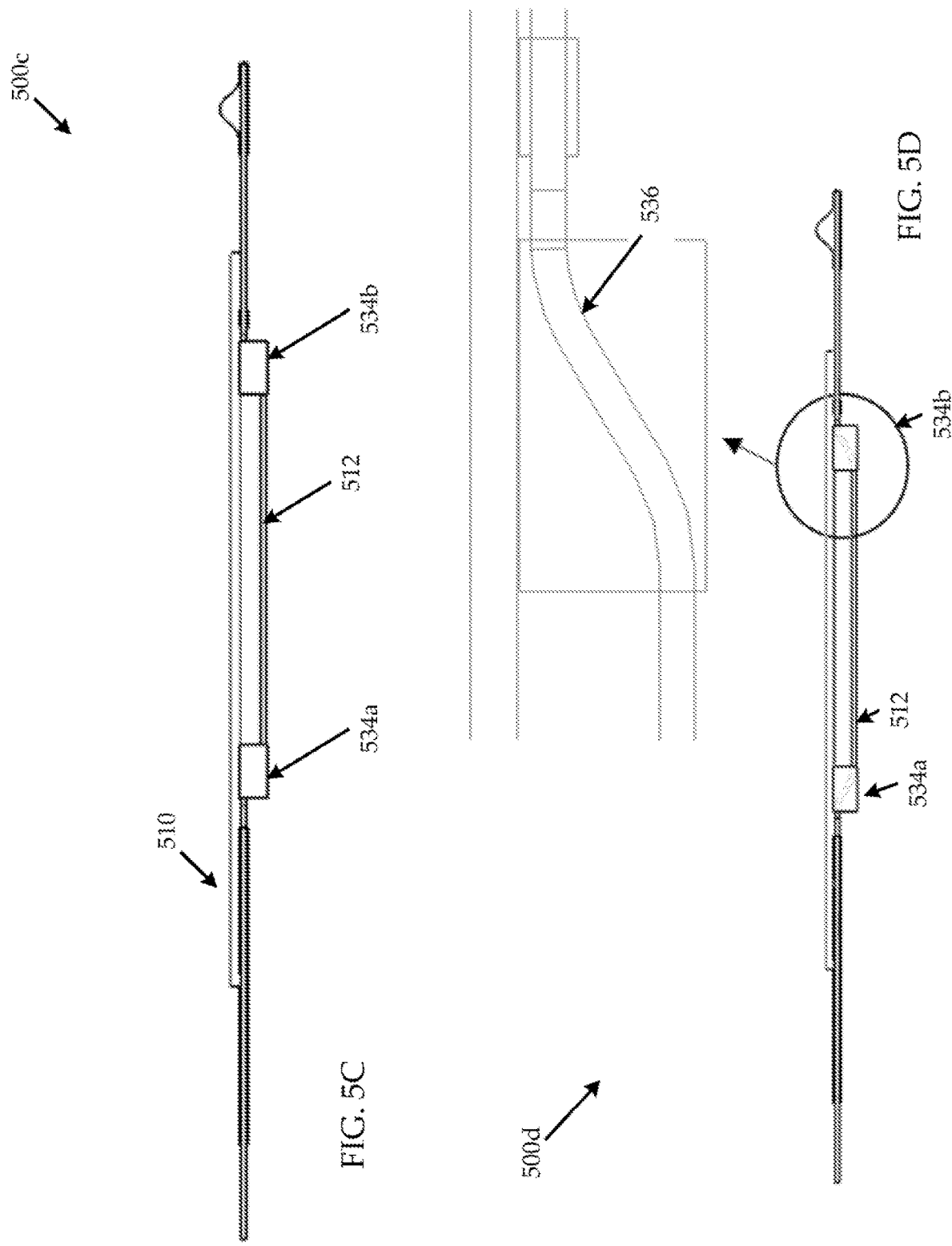

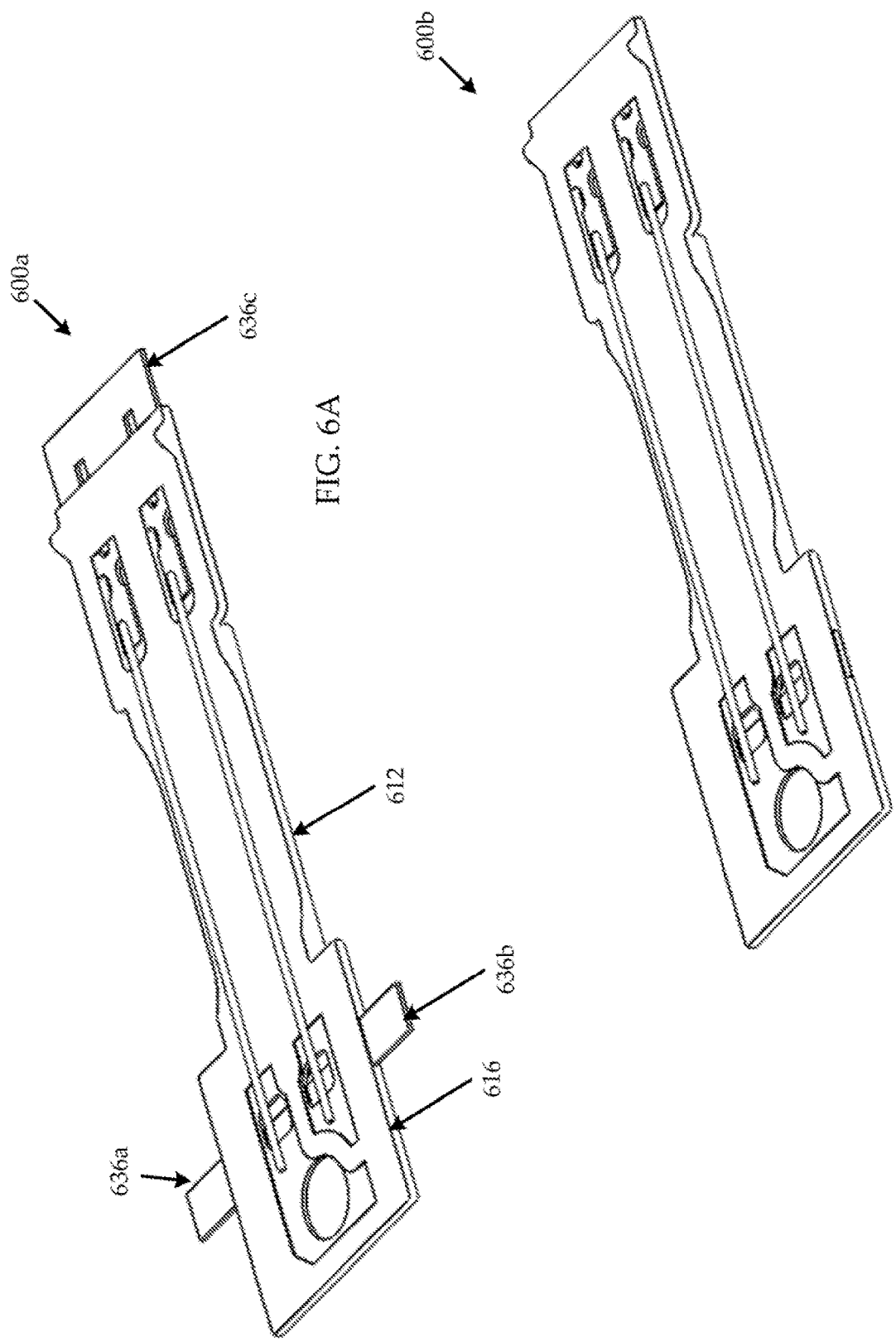

SHAPE MEMORY ALLOY (SMA) BIMORPH ACTUATORS AND METHODS FOR MANUFACTURING THE SAME

TECHNICAL FIELD

Embodiments of the invention relate to the field of shape memory alloy systems. More particularly, embodiments of the invention relate to the field of shape memory alloy actuators and methods related thereto.

BACKGROUND

Shape memory alloy ("SMA") systems can include an actuator or structure that can be used in conjunction with various components, such as a camera lens element as an auto-focusing drive or an optical image stabilization (OIS) drive. The SMA actuator can be configured to actuate responsive to providing an electrical current to the SMA wire.

For example, a first end of an SMA wire can be engaged at a fixed end fixed to a base. Further, a second end of the SMA wire can be engaged to a free end configured to move in response to the actuation of the SMA wire. For instance, the free end can move in a z-direction in response to the actuation of the SMA wire.

SUMMARY

The present embodiments relate to shape memory alloy (SMA) actuators with a limited number of materials used in manufacturing of SMA actuators.

In a first example embodiment, a shape memory alloy (SMA) actuator is provided. The SMA actuator can include a carriage and a base. The base can include a fixed end fixed to the carriage, a free end, a beam connecting the fixed end and the free end, and at least one SMA wire. Each of the at least one SMA wire can be electrically connected to the fixed end at a first set of electrical contacts, and electrically connected to the free end at a second set of electrical contacts. The at least one SMA wire can be configured to actuate the free end of the base responsive to receiving an electrical current. The SMA actuator can further include an insulator comprising a dielectric material disposed at the fixed end of the base via an injection molding process. The insulator can electrically isolate the first set of electrical contacts at the fixed end of the base.

In some instances, the carriage is engaged to the base via any of a heat staking process or an adding an adhesive between the carriage and the base. The heat staking process can include applying heat to a protrusion extending from the carriage through a recess formed in the fixed end of the base.

In some instances, a strut portion of the fixed end is removed via a detab process to disconnect the first set of electrical contacts at the fixed end.

In some instances, the SMA actuator can include a load point comprising the dielectric material. The load point can be injection molded onto the free end.

In some instances, the SMA actuator can include a set of stiffening ribs disposed adjacent to the second set of electrical contacts at the free end. The set of stiffening ribs can include the dielectric material. The set of stiffening ribs can be injection molded onto the free end.

In some instances, the carriage and the insulator comprise a unitary piece of the dielectric material.

In some instances, the SMA actuator can include a first joint element injection molded at the fixed end and a second joint element injection molded at the free end. The first joint element and the second joint element can include the dielectric material electrically insulating the at least one SMA wire from the base. The beam can be connected to the fixed end via the first joint element and the free end via the second joint element.

In some instances, the beam and the insulator can comprise a unitary piece of the dielectric material. In some instances, the SMA actuator can be part of a lens assembly as an autofocus actuator or part of an optical image stabilization system.

In another example embodiment, a method for manufacturing a shape memory alloy (SMA) actuator is provided. The method can include engaging a carriage to a base. The base can include a fixed end fixed to the carriage, a free end, a beam connecting the fixed end and the free end, and at least one SMA wire. Each of the at least one SMA wire can be electrically connected to the fixed end at a first set of electrical contacts, and electrically connected to the free end at a second set of electrical contacts. The at least two one SMA wire can be configured to actuate the free end of the base responsive to receiving an electrical current. The method can also include disposing an insulator at the fixed end of the base via an injection molding process. The insulator can comprise a dielectric material and the insulator electrically isolating the first set of electrical contacts at the fixed end of the base.

In some instances, engaging the carriage to the base comprises any of a heat staking process comprising applying heat to a protrusion extending from the carriage through a recess formed in the fixed end of the base or adding an adhesive between the carriage and the base.

In some instances, the method includes removing a strut portion of the fixed end is removed via a detab process to disconnect the first set of electrical contacts at the fixed end.

In some instances, the method includes disposing a load point comprising the dielectric material onto the free end during the injection molding process.

In some instances, the carriage comprises the dielectric material, and wherein the carriage is engaged to the base during the injection molding process.

In some instances, the method includes disposing a first joint element of the dielectric material at the fixed end via the injection molding process and disposing a second joint element at the free end via the injection molding process. The first joint element and the second joint element can electrically insulate the at least one SMA wire from the base. The beam can be connected to the fixed end via the first joint element and the free end via the second joint element.

In some instances, the beam comprises the dielectric material. The method can also include disposing the beam to the fixed end and the free end of the base via the injection molding process.

In another example embodiment, a SMA actuator is provided. The SMA actuator can include a carriage and a base. The base can include a fixed end fixed to the carriage, a free end, a beam connecting the fixed end and the free end, and at least one SMA wire. Each of the at least one SMA wire electrically connected to the fixed end at a first set of electrical contacts, and electrically connected to the free end at a second set of electrical contacts. The at least one SMA wire can be disposed above the base, except at the first set of electrical contacts and at the second set of electrical contacts, to electrically isolate the at least one SMA wire from the base.

In some instances, the at least one SMA wire are coated with a coating.

In some instances, the SMA actuator can also include a first bumper disposed at the fixed end between the at least one SMA wire and the fixed end of the base and a second bumper disposed at the free end between the at least one SMA wire and the free end of the base.

In some instances, the first set of electrical contacts are coined to offset the at least one SMA wire from the base.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which:

FIGS. 2A-2F illustrate an SMA actuator manufactured according to a first example embodiment.

FIGS. 4A-4F illustrate an actuator according to a third example embodiment.

FIGS. 5A-5D illustrate an actuator according to a fourth example embodiment.

FIGS. 6A-6B illustrate an actuator according to a fifth example embodiment.

DETAILED DESCRIPTION

The present embodiments relate to shape memory alloy (SMA) actuators. SMA actuators as described herein can include a compact footprint and provide a high actuation height, for example movement in the positive z-axis direction (z-direction), referred to herein as z-stroke movement. The SMA actuator as described herein can include an SMA bimorph actuator. The SMA actuator may be used in many applications including, but not limited to, a lens assembly as an autofocus actuator, a micro-fluidic pump, a sensor shift, optical image stabilization, optical zoom assembly, to mechanically strike two surfaces to create vibration sensations typically found in haptic feedback sensors and devices, and other systems where an actuator is used. For example, embodiments of an actuator described herein could be used as a haptic feedback actuator for use in cellphones or wearable devices configured to provide the user an alarm, notification, alert, touched area or pressed button response. Further, more than one SMA actuator could be used in a system to achieve a larger stroke.

In some embodiments, the SMA actuator can include a z-stroke that is greater than 0.4 millimeters (e.g., such as 0.7-1 mm). Further, the SMA actuator for various embodiments can have a height in the z-direction of around 0.4 millimeters or less, when the SMA actuator is in its initial, a de-actuated position. Various embodiments of the SMA actuator can be configured as an autofocus actuator in a lens assembly may have a footprint as small as 3 millimeters greater than the lens inner diameter. According to various embodiments, the SMA actuator may have a footprint that is wider in one direction to accommodate components including, but not limited to, sensors, wires, traces, and connectors. According to some embodiments, the footprint of an SMA actuator is 0.5 millimeters greater in one direction, for example the length of the SMA actuator is 0.5 millimeters greater than the width.

Figure 1:
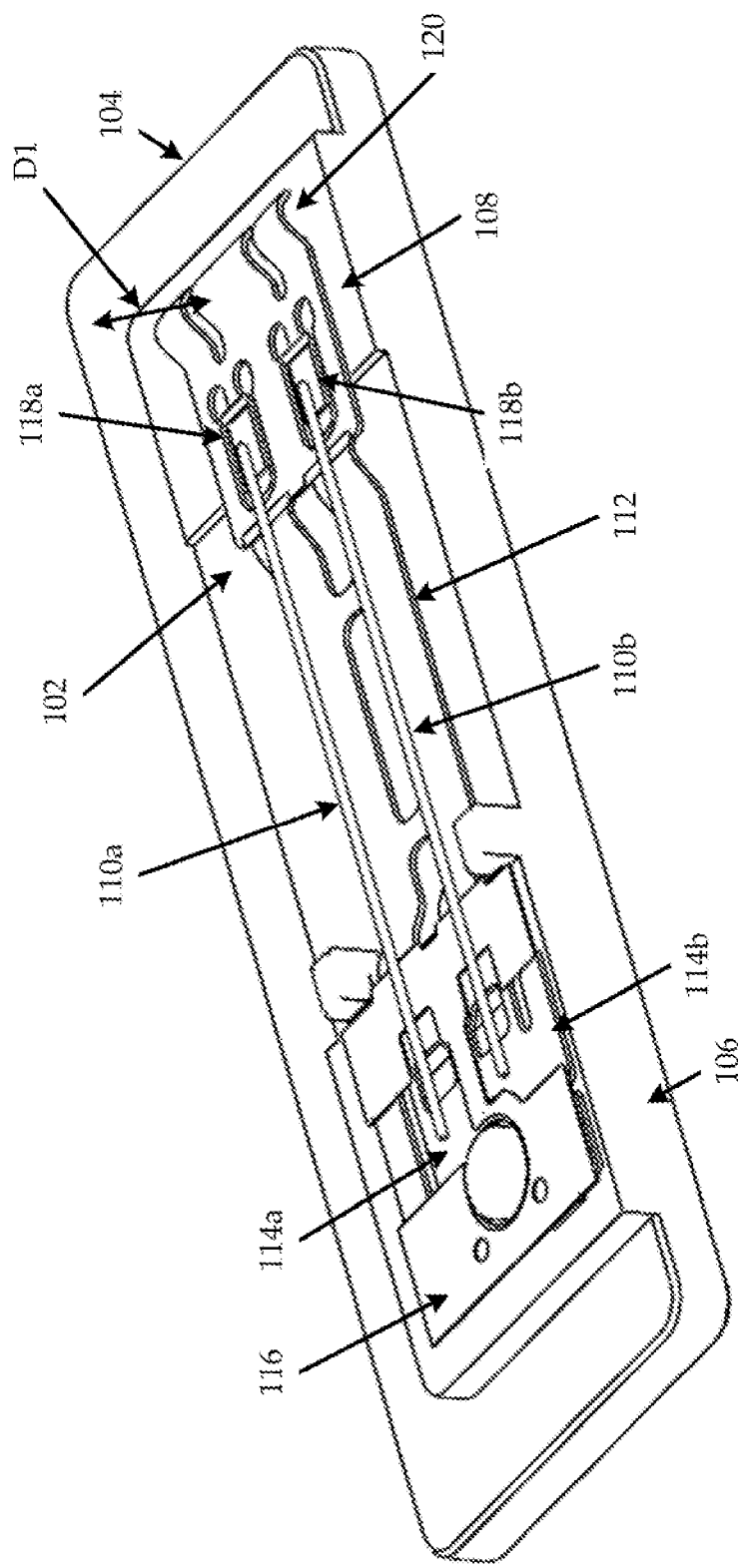
FIG. 1 illustrates an example Prior Art SMA bimorph actuator.

FIG. 1 illustrates an example prior art SMA bimorph actuator 100. As shown in FIG. 1, the actuator 100 can include a base 102 and a carriage 104. In many instances, the base 102 can be affixed to the carriage 104 as described herein. The carriage 104 can increase resiliency of the actuator 100 by providing support for the base 102.

The base 102 can include a fixed end 106 and a free end 108. The fixed end 106 can be fixed to the carriage 104, while the free end 108 can be detached from the carriage 104. As described in greater detail below, the free end 108 can move in a z-stroke direction (e.g., direction D1) responsive to providing an electrical current to SMA wires 110a, 110b.

The fixed end 106 can be attached to the carriage 104. Further, the beam 112 may not be attached to the carriage 104, allowing the beam to lift away from the carriage similar to the free end 108.

As shown in FIG. 1, SMA wires 110a, 110b can extend from the fixed end 106 to the free end 108 of the base 102. Further, a beam 112 can be disposed below the SMA wires 110a, 110b and can connect the fixed end 106 and free end 108. The SMA wires 110a, 110b can connect to the base 102 at each end via electrical contacts. For example, at a first end of each SMA wires 110a, 110b, the SMA wires 110a, 110b can connect to the fixed end 106 at electrical contacts 114a, 114b. Further, at a second end (e.g., at the free end 108), the SMA wires 110a, 110b can connect to the free end 108 at electrical contacts 118a, 118b (e.g., via a welding or soldering process).

The base 102 can consist of a material such as steel or stainless steel, for example. Further, electrical contacts 114a-b, 118a-b can include a material allowing for receiving a welding or soldering joint, such as a gold-plated stainless steel, for example. Further, at free end 106, a dielectric 116 can isolate the electrical contacts 114a-b to prevent electrical current between the contacts. Dielectric 116 can include insulative materials, such as a Polyimide, for example. In some embodiments, a dielectric can be disposed between SMA wires 110a-110b and beam 112 at the free end 108 to electrically isolate the SMA wires 110a-b from the beam 112.

In some instances, the actuator can include a three-layer design, with a first layer comprising stainless steel (e.g., forming base 102), a second layer comprising a polyimide (e.g., isolating electrical contacts, and a third layer comprising gold-plated stainless steel.

In some embodiments, the actuator can include alternative designs with a reduced number of layers. Actuators comprising these alternative designs can require fewer resources and can reduce processing steps to manufacture an actuator as described herein.

In a first example embodiment, an injection molding process can be provided. The injection molding process can include adding a dielectric material to the actuator can isolate electrical circuits, such as the dielectric 116 isolating circuits 114a-114b in FIG. 1. In some instances, a load point can be injection molded. Further, stiffening ribs comprising the injection molding material can be disposed at the free end adjacent to the ends of the electrical contacts.

In a second example embodiment, the carriage and the dielectric can be manufactured via an injection molding process. The base can include a metallic material, while the carriage and dielectric can comprise a unitary piece of an injection molding material.

In a third example embodiment, the base can be affixed to the carriage via a heat stake or glue process. Particularly, in the third example embodiment, no injection molding material or any dielectric materials may need to be added to isolate the electrical circuits.

In a fourth example embodiment, a molded bimorph beam offset can be added. Particularly, the beam can be attached to injection molded components at the free end and fixed end. The beam can include a piece separate from the free end and fixed end of the base.

In a fifth example embodiment, the beam can comprise an injection molded material. Particularly, an injection molded material can include a unitary piece comprising the dielectric at the fixed end, the beam, and a portion disposed around the free end. The carriage can include either a metallic material or the injection molding material.

Figures 2E, 2F:
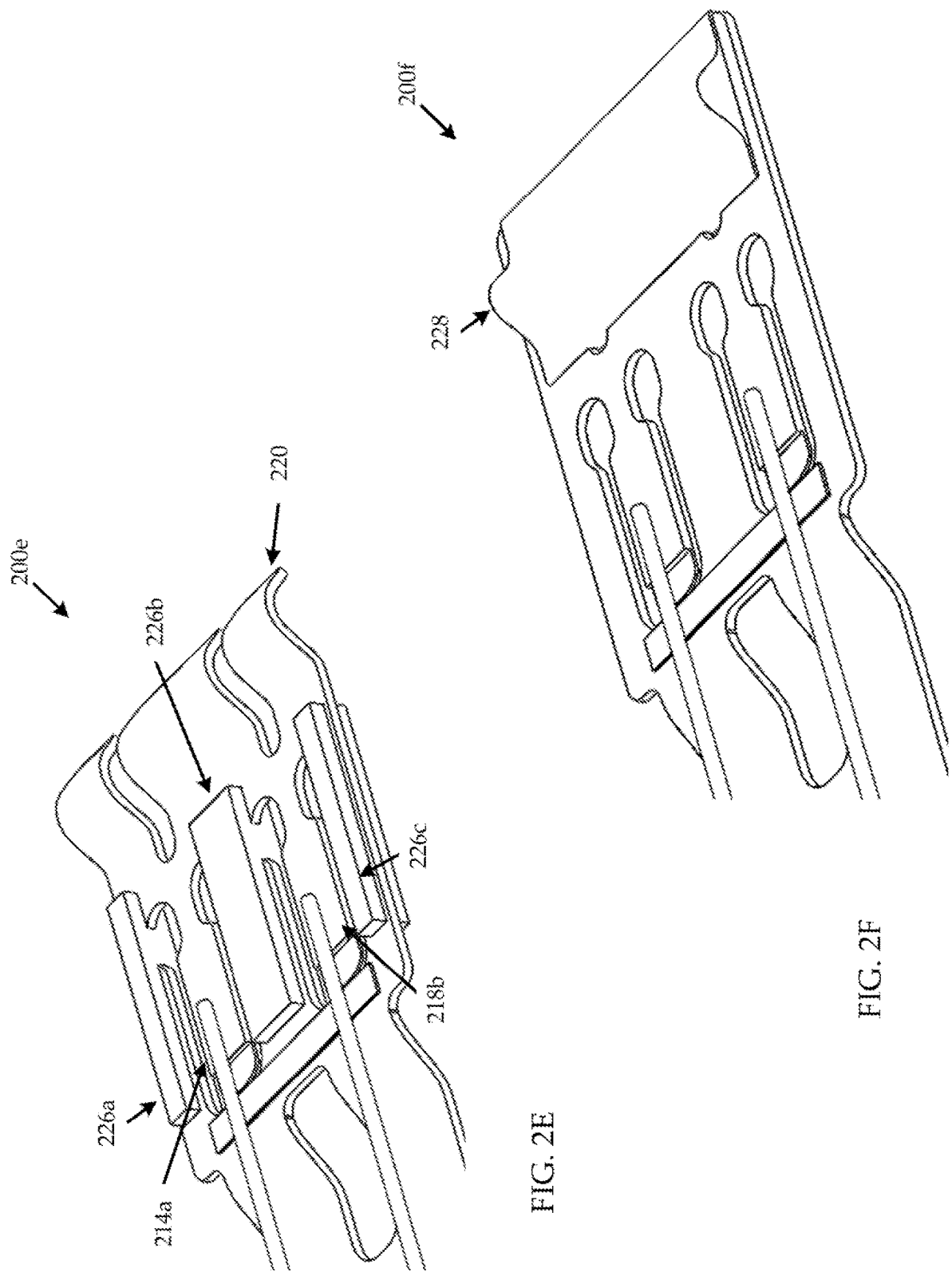

FIGS. 2A-2F illustrate an SMA actuator 200a-f manufactured according to a first example embodiment. As shown in FIG. 2A, the actuator 200a can include an injection molding material included as the dielectric 216 at the fixed end and between the SMA wire and the free end. The injection molding (or dielectric) material can include any of a variety of plastics, thermoplastics, or polycarbonate materials. Example materials for the injection molding materials as described herein can include acrylic (PMMA), liquid crystal polymers (LCP), acrylonitrile butadiene styrene (ABS), nylon polyamide (PA), polycarbonate (PC), polyethyelene (PE), polyoxymethylene (POM), polypropylene (PP), polystyrene (PS), thermoplastic elastomer (TPE), thermoplastic polyurethane (TPU), etc. An injection molding injector can add the injection molding material as described herein.

At FIG. 2B, the actuator 200b can include the carriage being provided to be connected to the base. The base can be attached to the carriage via a heat stake or a gluing process. A protrusion 222 extending from the carriage can be extended into a recess 220 in the base to line up and allow the attachment of the base to the carriage. For example, the heat staking process can heat the protrusion 222 to distribute the protrusion material about the recess 220 to affix the base to the carriage.

At FIG. 2C, the actuator 200c can include the base being affixed to the carriage. Further, a strut portion (e.g., 218) of the base can be removed via a detab process. The removal of the strut portion (e.g., at the removal line 224) and the inclusion of the injection molding material at the dielectric can allow for isolation of the electrical contacts so as to not allow for grounding or shorting of the electrical contacts. FIG. 2D illustrates the actuator 200d with the strut portion removed.

In some embodiments, a load point can comprise an injection molded material. Rather than comprising a formed load point (e.g., 220 as shown in free end of FIG. 1), the load point can comprise a flat metallic material and the formed load point 228 can be disposed above the flat load point. The formed load point 228 can comprise the dielectric material via the injection molding process.

Further, in some embodiments, stiffening ribs can be disposed on the free end. For example, ribs 226a-c can be disposed between the electrical contacts 214a-b connecting the SMA wires to the free end. The stiffening ribs can increase structural support of the connection (e.g., weld connection, solder connection) between the electrical contacts and the SMA wires.

Figure 3:
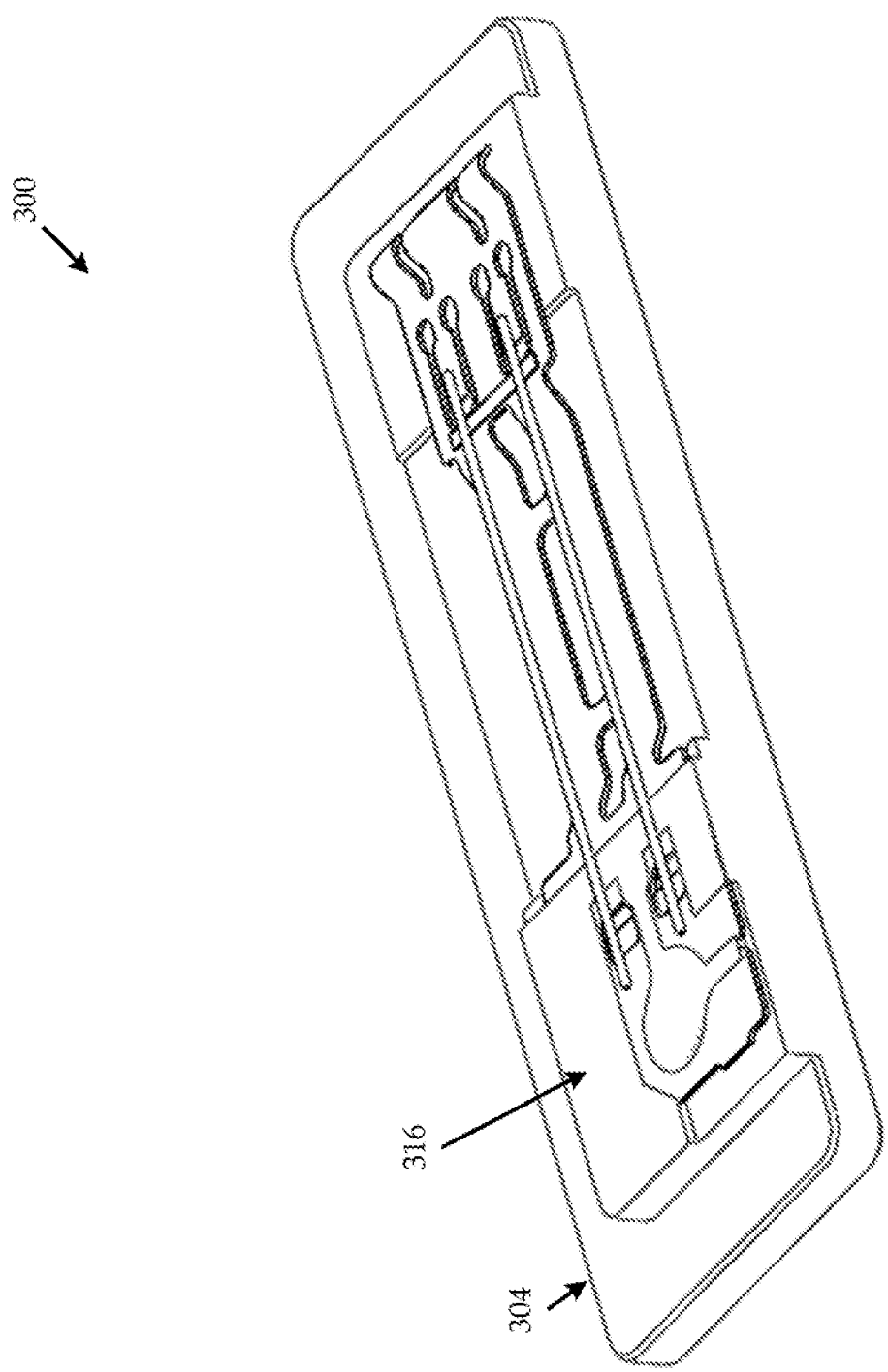
FIG. 3 illustrates an actuator according to a second example embodiment.

FIG. 3 illustrates an actuator 300 according to a second example embodiment. In the actuator 300 as shown in FIG. 3, the carriage 304 and dielectric 316 can comprise an injection molding material. In some instances, the injection molding material can include a unitary piece. For instance, the injection molding material can be inserted around the base, with the injection molding material forming the carriage and dielectric isolating electrical circuits. Further, a strut portion of the base can be removed via a detab process after the insertion of the injection molding material.

FIGS. 4A-4F illustrate an actuator 400a-f according to a third example embodiment. As shown in FIGS. 4A-4F, the base can be attached to the carriage without any injection molding material. For example, in FIG. 4A, the SMA wires can include an uncoated or coated wire. If the wire is coated, the coating can insulate the SMA wire from the base. Further, in some instances, no wire bumpers isolating the SMA wire and the base may be present. The SMA wires can be elevated above the base except at the electrical connections so as to isolate the SMA wires from the base.

Figure 4C:
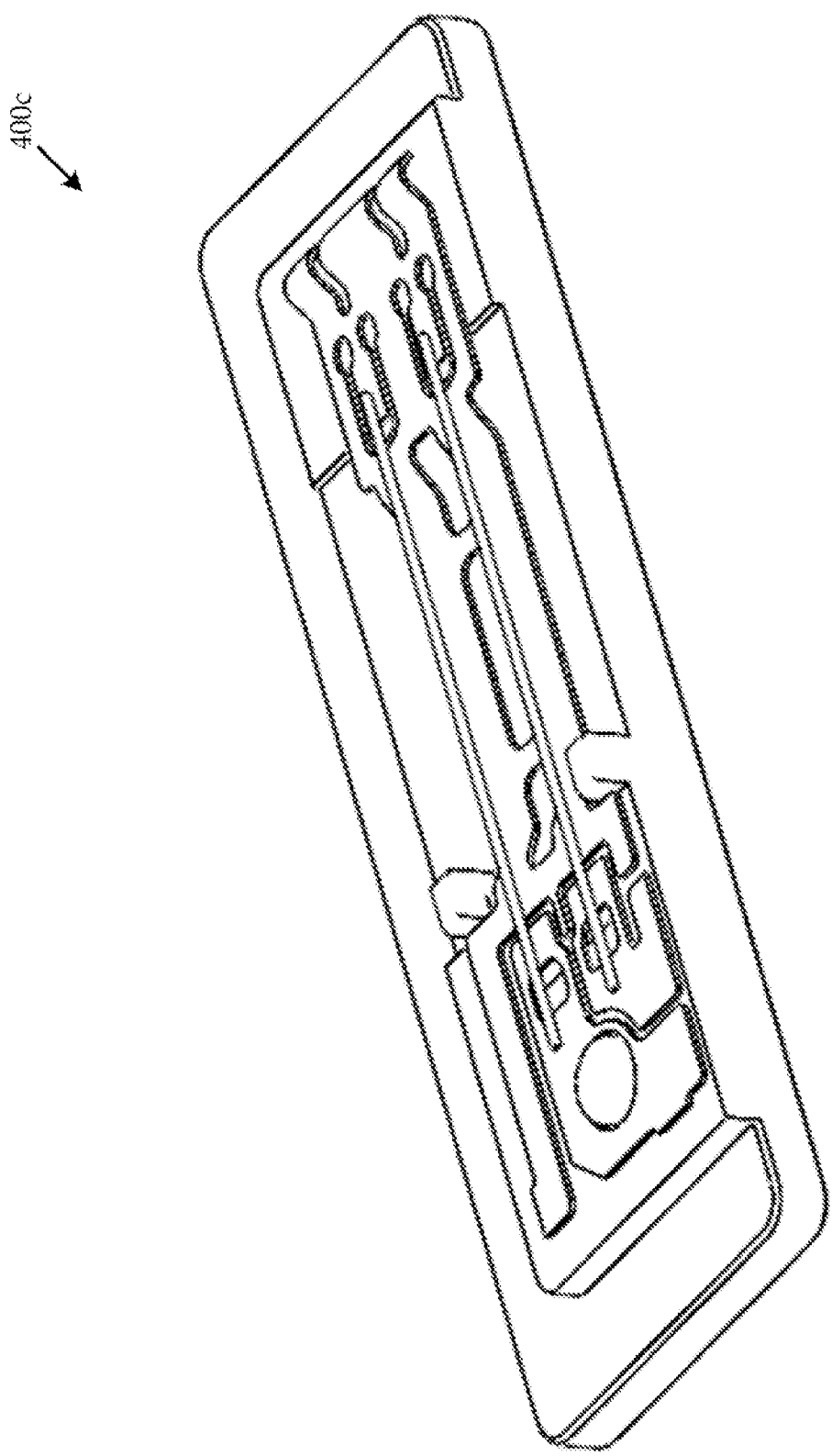
Figure 4F:
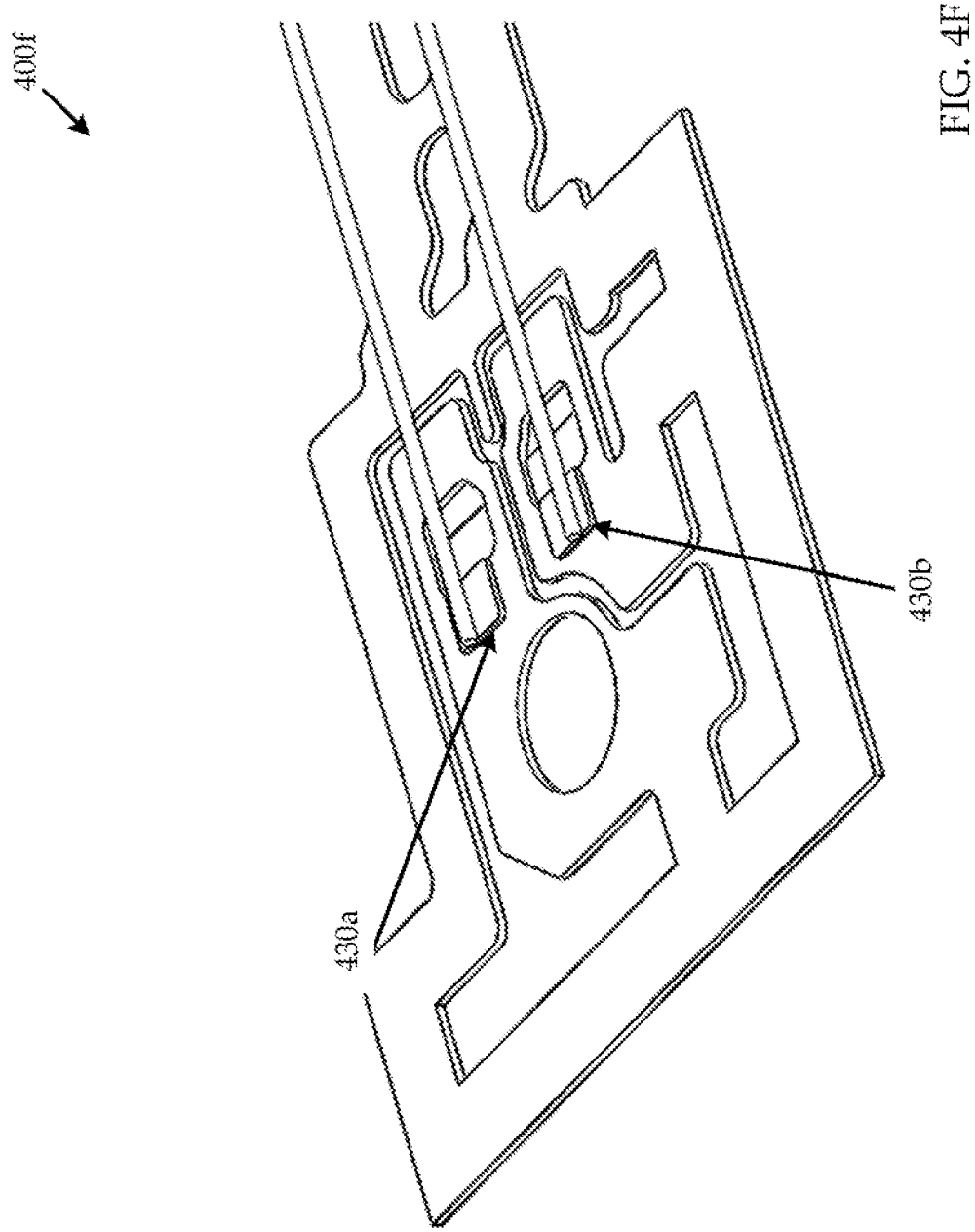

In FIG. 4B, the base can be attached to the carriage with the base frame 402 intact. The base 402 can be attached to the carriage 404 via a heat stake or a gluing process. In FIG. 4C, the strut portion of the base 418 can be removed via a detab process. For example, the detab process can include a laser removing the strut portion.

In some instances, the space between the SMA wire and the base can be isolated using one or more bumpers 428 a-b. In FIG. 4D, a set of bumpers 428 a-b can be added under the SMA wire to electrically isolate the SMA wire from the bumpers. The wire bumpers (or pick and place bumpers) can include a thin insulating material that can be adhered to the base. As shown in FIGS. 4D-4E actuator 400D-E can include any of a carriage 440 and a base 432. The base 432 can include any of the fixed end 434, free end 438, and SMA wires 436A-B disposed between the fixed end 434 and free end 438. The SMA wires 436A-B can be attached to the fixed end 434 at electrical contacts 442A-B, and attached to the free end 438 at electrical contacts 444A-B.

In some instances, the carriage can include a metallic material enabling a welded attach of the base. For example, in FIG. 4E, the fixed end of the base can be welded to the carriage.

In some instances, the SMA wires can be offset by wire attachment pads. For example, in FIG. 4F, pads 430a-b can be coined or insert molded to elevate (or offset) the SMA wires to isolate the wires from the base.

FIGS. 5A-5D illustrate an actuator according to a fourth example embodiment. For example, the base can include an insert molded biomorph beam offset 512. For instance, in FIG. 5A, beam 512 can be connected to multiple molded joints 534a-b forming the beam to the base. In some instances, the base can include an outer frame 532. The outer frame 532 can include additional material used for manufacturing and supporting the beam 512. In some instances, three biomorph sections, such as the base, beam, and tip, can be tabbed to the outer frame during manufacturing.

In some instances, the outer frame 532 can be removed. For instance, in FIG. 5B, the outer frame can be removed, leaving the beam engaged to the molded joints 534a-b. In some instances, the actuator can include the molded load point 528 comprising a dielectric material from an injection molding process.

In some instances, the beam 512 can be disposed below the base. For example, FIG. 5C shows the beam 512 below a base of the actuator 500c. Further, the beam 512 can be connected to molded joints 534a-b.

In some instances, the beam 512 can include a singular piece of metal (e.g., stainless steel). For example, as shown in FIG. 5D, the beam 512 can include portions (e.g., 536) disposed through weld joints 534a-b.

FIGS. 6A-6B illustrate an actuator 600a-b according to a fifth example embodiment. For instance, as shown in FIG.

6A, the actuator 600a can include a beam 612 comprising the injection molding material. The dielectric 616 and the beam 612 can form a single piece of injection molded material. The injection molding material can also be disposed at the free end. Portions of the fixed end and free end can be exposed from the injection molding material to allow for electricity to flow between electrical contacts and the SMA wires as described herein.

In some instances, a number of tabs 636a-c comprising a metal can be removed. The tabs 636a-c can be used for manufacturing of the fixed end and free end part of the actuator as described herein.

As shown in FIG. 6B, the tabs 636a-c can be removed. The actuator 600b can further be affixed to a carriage as described herein.

In a first example embodiment, a shape memory alloy (SMA) actuator is provided. The SMA actuator can include a carriage (e.g., 104) and a base (e.g., 102). The base can include a fixed end (e.g., 106) fixed to the carriage, a free end (e.g., 108), a beam (e.g., 112) connecting the fixed end and the free end, and at least two SMA wires (e.g., 110a-b). Each of the at least two SMA wires can be electrically connected to the fixed end at a first set of electrical contacts (e.g., 114a-b), and electrically connected to the free end at a second set of electrical contacts (e.g., 118a-b). The at least two SMA wires can be configured to actuate the free end (e.g., 108) of the base responsive to receiving an electrical current. The SMA actuator can further include an insulator (e.g., 116, 216) comprising a dielectric material disposed at the fixed end of the base via an injection molding process. The insulator can electrically isolate the first set of electrical contacts at the fixed end of the base.

In some instances, the carriage is engaged to the base via any of a heat staking process or an adding an adhesive between the carriage and the base. The heat staking process can include applying heat to a protrusion (e.g., 222) extending from the carriage through a recess (E.G., 220) formed in the fixed end of the base.

In some instances, a strut portion (e.g., 218) of the fixed end is removed via a detab process to disconnect the first set of electrical contacts at the fixed end.

In some instances, the SMA actuator can include a load point (e.g., 228 in FIG. 2F) comprising the dielectric material. The load point can be injection molded onto the free end.

In some instances, the SMA actuator can include a set of stiffening ribs (e.g., 226a-c in FIG. 2E) disposed adjacent to the second set of electrical contacts at the free end. The set of stiffening ribs can include the dielectric material. The set of stiffening ribs can be injection molded onto the free end.

In some instances, the carriage and the insulator comprise a unitary piece of the dielectric material. For instance, the carriage 304 and insulator 316 can include a single piece of the dielectric material.

In some instances, the SMA actuator can include a first joint element (e.g., 534a) injection molded at the fixed end and a second joint element (e.g., 534b) injection molded at the free end. The first joint element and the second joint element can include the dielectric material electrically insulating the at least two SMA wires from the base. The beam (e.g., 512) can be connected to the fixed end via the first joint element and the free end via the second joint element.

In some instances, the beam (e.g., 612) and the insulator (e.g., 616) can comprise a unitary piece of the dielectric material. In some instances, the SMA actuator can be part of a lens assembly as an autofocus actuator or part of an optical image stabilization system.

In another example embodiment, a method for manufacturing a shape memory alloy (SMA) actuator is provided. The method can include engaging a carriage to a base. The base can include a fixed end fixed to the carriage, a free end, a beam connecting the fixed end and the free end, and at least two SMA wires. Each of the at least two SMA wires can be electrically connected to the fixed end at a first set of electrical contacts, and electrically connected to the free end at a second set of electrical contacts. The at least two SMA wires can be configured to actuate the free end of the base responsive to receiving an electrical current. The method can also include disposing an insulator at the fixed end of the base via an injection molding process. The insulator can comprise a dielectric material and the insulator electrically isolating the first set of electrical contacts at the fixed end of the base.

In some instances, engaging the carriage to the base comprises any of a heat staking process comprising applying heat to a protrusion extending from the carriage through a recess formed in the fixed end of the base or adding an adhesive between the carriage and the base.

In some instances, the method includes removing a strut portion of the fixed end is removed via a detab process to disconnect the first set of electrical contacts at the fixed end.

In some instances, the method includes disposing a load point comprising the dielectric material onto the free end during the injection molding process.

In some instances, the carriage comprises the dielectric material, and wherein the carriage is engaged to the base during the injection molding process.

In some instances, the method includes disposing a first joint element of the dielectric material at the fixed end via the injection molding process and disposing a second joint element at the free end via the injection molding process. The first joint element and the second joint element can electrically insulate the at least two SMA wires from the base. The beam can be connected to the fixed end via the first joint element and the free end via the second joint element.

In some instances, the beam comprises the dielectric material. The method can also include disposing the beam to the fixed end and the free end of the base via the injection molding process.

In another example embodiment, a SMA actuator is provided. The SMA actuator can include a carriage and a base. The base can include a fixed end fixed to the carriage, a free end, a beam connecting the fixed end and the free end, and at least two SMA wires. Each of the at least two SMA wires electrically connected to the fixed end at a first set of electrical contacts, and electrically connected to the free end at a second set of electrical contacts. The at least two SMA wires can be disposed above the base, except at the first set of electrical contacts and at the second set of electrical contacts, to electrically isolate the at least two SMA wires from the base.

In some instances, the at least two SMA wires are coated with a coating.

In some instances, the SMA actuator can also include a first bumper disposed at the fixed end between the at least two SMA wires and the fixed end of the base and a second bumper disposed at the free end between the at least two SMA wires and the free end of the base.

In some instances, the first set of electrical contacts are coined to offset the at least two SMA wires from the base.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A shape memory alloy (SMA) actuator comprising:
   a carriage; and
   a base comprising:
      a fixed end fixed to the carriage;
      a free end;
      a beam connecting the fixed end and the free end;
      a first SMA wire and a second SMA wire electrically connected to the fixed end at a first set of electrical contacts at a first end of each SMA wire, and electrically connected to the free end at a second set of electrical contacts at a second end of each SMA wire, wherein a first portion of the base contacts the first end of the first SMA wire, and a second portion of the base contacts the first end of the second SMA wire, wherein the first portion and the second portion are electrically isolated via a trench formed between the first portion and the second portion, the first SMA wire and the second SMA wire are disposed above the base, except at the first set of electrical contacts and at the second set of electrical contacts, to electrically isolate the first SMA wire and the second SMA wire from the base.

2. The SMA actuator of claim 1, wherein at least one of the first and the second SMA wires are coated with a coating.

3. The SMA actuator of claim 1, further comprising:
   a first bumper disposed at the fixed end between at least one of the first and the second SMA wires and the fixed end of the base; and
   a second bumper disposed at the free end between at least one of the first and the second SMA wires and the free end of the base.

4. The SMA actuator of claim 1, wherein the first set of electrical contacts are coined to offset at least one of the first and the second SMA wires from the base.

5. The SMA actuator of claim 4, wherein at least one of the first and the second SMA wires is offset from the base via wire attachment pads by the coining or an insert molding process.

6. The SMA actuator of claim 1, wherein the carriage comprises a metallic material enabling a welded attachment of the base and the carriage.

7. The SMA actuator of claim 1, wherein the carriage is engaged to the base via any of a heat staking process or an adding an adhesive between the carriage and the base, wherein the heat staking process comprises applying heat to a protrusion extending from the carriage through a recess formed in the fixed end of the base.

8. The SMA actuator of claim 1, wherein a strut portion of the fixed end is removed via a detab process to disconnect the first set of electrical contacts at the fixed end.

* * * * *